April 5, 1960  A. C. DE ANGELIS ET AL  2,931,926
ELECTRIC MOTOR MOUNTING MEANS
Original Filed Sept. 15, 1955

*INVENTORS*
ANGELO C. DE ANGELIS
HARRY E. BUTTERFIELD, JR.

2,931,926

ELECTRIC MOTOR MOUNTING MEANS

Angelo C. De Angelis, New Shrewsbury, and Harry E. Butterfield, Jr., Maplewood, N.J., assignors, by mesne assignments, to Dynamics Corporation of America, New York, N.Y., a corporation of New York Original application September 15, 1955, Serial No. 534,499, now Patent No. 2,812,166, dated November 5, 1957. Divided and this application August 5, 1957, Serial No. 676,338

1 Claim. (Cl. 310—50)

This invention relates to improvements in electric motor driven mixers and is concerned more particularly with portable food and beverage mixers known as hand mixers.

The general object of the invention is to provide an improved device from the standpoints of adaptability for varied uses, convenience of manipulation, economy of manufacture and durability in use.

More specifically, it is an object of the invention to provide an improved motor mounting means whereby the motor is securely supported yet is readily accessible for repair or replacement when necessary.

Other objects and advantages of the invention will be apparent from the following detailed explanation taken in conjunction with the accompanying drawings wherein a preferred embodiment of the principles of the invention has been selected for exemplification.

Figure 1:
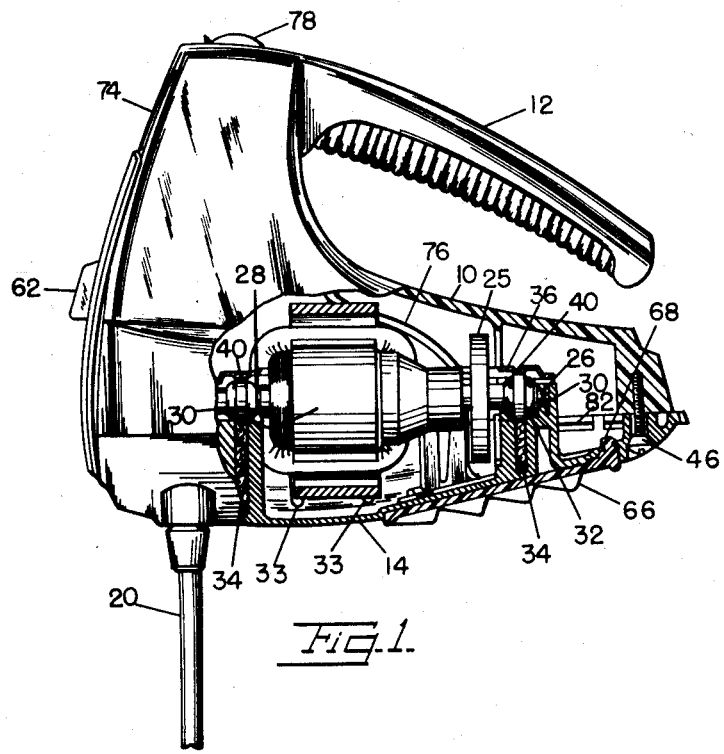
Fig. 1 is a side elevational view of the device partly in section to show the motor supporting construction.
Figure 2:
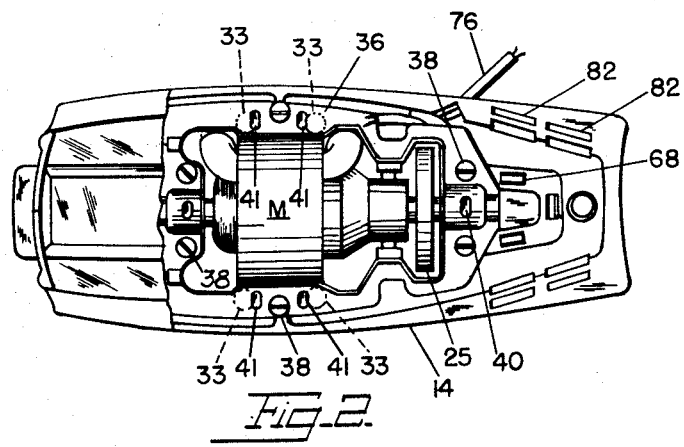
Fig. 2 is a top plan view of the device partly in section.

Referring more particularly to the drawings, wherein like designations refer to like parts, the device in its essentials is composed of a top housing 10 including an integral handle 12 which may, if desired, be molded from any suitable plastic material. As shown in Fig. 1, the handle 12 slopes rearwardly and downwardly at a convenient angle for grasping by the user. The bottom housing 14 is preferably cast of metal and the two housings are detachably secured together by screws or the like 16.

The electric motor designated in its entirety at M may also be of conventional construction and includes a shaft 22 having a driving worm (not shown) at its forward end. A fan 25 and a forward thrust washer 28 are provided and the rearward end of the shaft bears against thrust ball 26. Motor shaft bearings 30 are provided and, for supporting the motor M in its entirety within the bottom housing 14, upright members in the form of saddle blocks 32 and intermediate pillars 33 extend upwardly of the bottom of the housing to form supports for the shaft bearings 30 and field assembly, respectively. The pillars 33 may be notched at their upper ends for centering as well as supporting the field assembly around the motor armature. The saddle blocks 32 may include suitable felt wicks or the like 34 as best shown in Fig. 1. A suitable cover plate 36 for the motor M may be secured to upwardly projecting posts in the bottom housing 14 by screws or the like 38. As a feature thereof, the cover plate 36 at the points thereof which overlie the motor shaft bearings 30 is provided with ribs 40 which urge the shaft bearings 30 into firm seating engagement with the supporting saddle blocks 32 and wicks 34 and with intermediate ribs 41 which secure the field assembly.

For the operation of the device, a cord or conduit 76 is provided for connection with an outlet for a source of electric current and multi-speed switch means indicated in its entirety at 78 is preferably provided such as shown, for example, in Patent Nos. 2,707,741 or 2,708,227. Such a switch is preferably mounted in the forward portion of the handle 12 in the manner claimed in Patent No. 2,719,238, dated September 27, 1955. Cooling of the motor M is provided by air drawn by the fan 25 through the rearward intake ports 82 provided in the bottom housing 14 and exhausted after traversing the motor M through the forward part of the housing.

It is to be understood that the specific construction and arrangements of parts herein illustrated and described are for exemplary purposes only and that the principles of the invention embrace all such variations and modifications thereof as come within the scope of the following claim.

This application is a division of our application Serial No. 534,499 filed September 15, 1955, for "Electric Mixer," now U.S. Patent No. 2,812,166 issued November 5, 1957.

We claim:

Mounting means for an electric motor including a field assembly, a rotor with shafts and bearings therefor, said motor being substantially horizontally disposed for driving the beater means of an electric mixer or the like which comprises, top and bottom housings for said motor, upright saddle blocks integral with said bottom housing for supporting said motor shaft bearings, pillars integral with said bottom housing for supporting said field assembly, a motor cover plate removably secured to said bottom housing and bearing against said field assembly for retaining said field assembly against said pillars, ribbed portions formed in said cover plate, said ribbed portions bearing against said shaft bearings for retaining said bearings against said upright saddle blocks, the said cover plate, saddle blocks and pillars providing substantially the sole means for supporting said motor in said bottom housing.

References Cited in the file of this patent

UNITED STATES PATENTS

| | | |
|---|---|---|
| 2,469,932 | Ritter | May 10, 1949 |
| 2,657,321 | Smithson | Oct. 27, 1953 |
| 2,719,238 | Collura | Sept. 27, 1955 |
| 2,761,983 | Koch | Sept. 4, 1956 |